UNITED STATES PATENT OFFICE.

JOHN LANDIN, OF STOCKHOLM, SWEDEN.

PROCESS OF MAKING AMMONIUM NITRATE.

SPECIFICATION forming part of Letters Patent No. 500,914, dated July 4, 1893.

Application filed March 2, 1893. Serial No. 464,452. (No specimens.) Patented in Belgium November 30, 1892, No. 102,100.

*To all whom it may concern:*

Be it known that I, JOHN LANDIN, engineer, a subject of the King of Sweden and Norway, and a resident of Stockholm, in the Kingdom of Sweden, have invented new and useful Improvements Relating to the Manufacture of Ammonium Nitrate, (for which I have obtained a patent in Belgium, dated November 30, 1892, No. 102,100,) of which the following is a specification.

This invention relates to the manufacture of ammonium nitrate, and its main object is the production of ammonium nitrate, quite free from any substance containing sulphur in a cheap and simple manner direct from sodium nitrate and ammonium sulphate. Moreover by this process sodium sulphate (Glauber's salt) of pure quality is obtained as a by-product.

According to this invention a solution is first formed by the percolation of alcohol or methylated spirit through a mixture of sodium nitrate and ammonium sulphate. This solution after the percolation aforesaid will contain ammonium nitrate and a small quantity of sodium nitrate and is treated with ammonium sulphate and ammonium chloride or with either ammonium sulphate or ammonium chloride as hereinafter set forth, for the production of ammonium nitrate.

By the percolation of alcohol or methylated spirit through the sodium nitrate and ammonium sulphate above mentioned, two different and separate products are formed—namely, (a) ammonium nitrate in solution containing some sodium nitrate, and (b) a residue of sodium sulphate containing some ammonium sulphate. The quantity of sodium nitrate in (a) and the quantity of ammonium sulphate in (b) depends on the proportions of the materials first used. If for example ammonium sulphate be used in excess, a less amount of sodium nitrate is formed in the solution.

In order to reduce or eliminate the sodium nitrate from the product (a) the alcoholic solution is passed through granulated ammonium sulphate. Most or all of the sodium nitrate is thereby transformed into sodium sulphate by the excess of ammonium sulphate and retains some of the latter and the product obtained in solution will be all or nearly all ammonium nitrate which may be solidified by evaporating the alcohol. As the sodium nitrate may not be completely eliminated by the above-described treatment the solution should before solidification of the ammonium nitrate is attempted be passed through ammonium-chloride. This salt being soluble in alcohol consequently reacts with greater vigor, and the remaining sodium nitrate is transformed into sodium chloride which is insoluble in alcohol. The solution then contains ammonium nitrate free from any sodium salt which may then be solidified by evaporation of the alcohol. Or instead of treating with ammonium sulphate and then with ammonium chloride, ammonium chloride, may be used alone. The by product sodium chloride is preferably used to obtain ammonium chloride by subliming it with the mixture (b) of sodium sulphate and ammonium sulphate above mentioned. Equivalent proportions of the ingredients being taken, ammonium chloride will be given off and the residue will consist of pure sodium sulphate (Glauber's salt.) The ammonium chloride thus recovered may be used again for the purpose above mentioned. From the mixture (b) of sodium sulphate and ammonium sulphate the ammonia in the ammonium sulphate may also be recovered by heating the mixture with sodium carbonate when ammonia or carbonate of ammonia which may be transformed into ammonium nitrate by absorption in nitric acid and sodium sulphate are obtained by which process the mixture (b) is also transformed into pure sodium sulphate (Glauber's salt.) The alcohol or methylated spirit also may be used again and again being recovered by the distillation which takes place as aforesaid when the ammonium nitrate is solidified.

In consequence of the utilization of the sodium chloride as above indicated and the recovery and utilization of the alcohol over and over again this process can be carried on continuously, and very cheaply, there being no waste products.

What I claim is—

1. A process for the manufacture of ammonium nitrate from sodium nitrate and ammonium sulphate by the aid of alcohol and ammonium chloride, by, percolating alcohol through a mixture of sodium nitrate and ammonium sulphate to produce (*a*) an alcoholic solution containing ammonium nitrate plus some sodium nitrate, and (*b*) a residue of sodium sulphate plus some ammonium sulphate; treating the said alcoholic solution by passing it first through ammonium sulphate and next through ammonium chloride thereby producing an alcoholic solution of ammonium nitrate and a precipitate of sodium sulphate and sodium chloride; then subliming the sodium chloride with the mixture of sodium sulphate and ammonium sulphate to produce sodium sulphate and ammonium chloride, substantially as described.

2. A process for the manufacture of ammonium nitrate from sodium nitrate and ammonium sulphate by the aid of alcohol and ammonium chloride, by, percolating alcohol through a mixture of sodium nitrate and ammonium sulphate to produce (*a*) an alcoholic solution containing ammonium nitrate plus some sodium nitrate and (*b*) a residue of sodium sulphate plus some ammonium sulphate; treating the said alcoholic solution by passing it through ammonium chloride thereby producing an alcoholic solution of ammonium nitrate and a precipitate of sodium sulphate and sodium chloride; then subliming the sodium chloride with the mixture of sodium sulphate and ammonium sulphate to produce sodium sulphate and ammonium chloride substantially as described.

3. A process for the manufacture of ammonium nitrate consisting of the following operations:—percolating alcohol through a mixture of sodium nitrate and ammonium sulphate to produce (*a*) an alcoholic solution containing ammonium nitrate plus some sodium nitrate, and (*b*) a residue consisting of sodium sulphate plus some ammonium sulphate; treating the said alcoholic solution by passing it first through ammonium sulphate and next through ammonium chloride, substantially as set forth, for the purposes specified.

4. For the manufacture of ammonium nitrate a process consisting of the following operations:—percolating alcohol or methylated spirit through a mixture of sodium nitrate and ammonium sulphate to produce (*a*) an alcoholic solution containing ammonium nitrate plus some sodium nitrate, and (*b*) sodium sulphate plus some ammonium sulphate; treating the said alcoholic solution by passing it through ammonium sulphate, substantially as set forth, for the purposes specified.

In witness whereof I have hereunto set my hand this 16th day of January, 1893.

JOHN LANDIN.

Witnesses:
CARL CUERELL.
L. ENGLAND.